(12) United States Patent
Okada

(10) Patent No.: US 11,029,174 B2
(45) Date of Patent: Jun. 8, 2021

(54) TERMINAL DEVICE, GROUP COMMUNICATION SYSTEM, AND GROUP COMMUNICATION METHOD

(71) Applicant: JVC KENWOOD Corporation, Yokohama (JP)

(72) Inventor: Naoyuki Okada, Yokohama (JP)

(73) Assignee: JVC KENWOOD Corporation, Yokohama (JP)

( * ) Notice: Subject to any disclaimer, the term of this patent is extended or adjusted under 35 U.S.C. 154(b) by 171 days.

(21) Appl. No.: 16/223,212

(22) Filed: Dec. 18, 2018

(65) Prior Publication Data

US 2019/0293449 A1 Sep. 26, 2019

(30) Foreign Application Priority Data

Mar. 23, 2018 (JP) .............................. JP2018-056221

(51) Int. Cl.
*G01C 21/36* (2006.01)
*G01C 21/00* (2006.01)
(Continued)

(52) U.S. Cl.
CPC ......... *G01C 21/3697* (2013.01); *G01C 21/28* (2013.01); *G01C 21/3667* (2013.01);
(Continued)

(58) Field of Classification Search
CPC ......... G01C 21/36; G01C 21/00; H04L 29/08;
B60Q 9/00; A61B 5/18; G06K 9/00;
G06Q 30/02; G09B 9/16; H04M 1/725;
B60R 16/02; G05D 1/02; B60K 37/02;
G08G 1/16
See application file for complete search history.

(56) References Cited

U.S. PATENT DOCUMENTS

2004/0189546 A1* 9/2004 Sumiyoshi ............. B60K 37/02
345/8
2004/0225416 A1* 11/2004 Kubota ............... B60R 16/0231
701/1

(Continued)

FOREIGN PATENT DOCUMENTS

JP 2007111247 A * 5/2007 ............... A61B 5/18
JP 2009-270886 11/2009
JP 2009270886 A * 11/2009 ............. G01C 21/00

*Primary Examiner* — Yuri Kan

(74) *Attorney, Agent, or Firm* — Amin, Turocy & Watson, LLP

(57) ABSTRACT

A terminal device includes a communication unit configured to transmit and receive information, an input unit configured to receive input of state information indicating a state of a movable object, and a controller configured to determine whether a predetermined state change has occurred in the movable object based on the input state information, acquire, as attention information, state-changed position information indicating a state-changed position that is a position of the movable object when the predetermined state change has occurred and attention voice information including an attention content for the state-changed position as voice when it is determined that the predetermined state change has occurred, and cause the communication unit to transmit the acquired attention information.

6 Claims, 6 Drawing Sheets

(51) Int. Cl.
*G06K 9/00* (2006.01)
*B60R 16/02* (2006.01)
*G08G 1/0968* (2006.01)
*G01C 21/28* (2006.01)
*H04W 4/46* (2018.01)

(52) U.S. Cl.
CPC . *G08G 1/096855* (2013.01); *G08G 1/096872* (2013.01); *G08G 1/096883* (2013.01); *H04W 4/46* (2018.02)

(56) References Cited

U.S. PATENT DOCUMENTS

| | | | |
|---|---|---|---|
| 2015/0002285 A1* | 1/2015 | Hatakeyama | G08G 1/166 340/435 |
| 2016/0134714 A1* | 5/2016 | Ono | H04W 4/025 709/205 |
| 2016/0205238 A1* | 7/2016 | Abramson | G08G 1/0137 455/456.4 |
| 2017/0080856 A1* | 3/2017 | Enomoto | A61B 5/18 |
| 2018/0144369 A1* | 5/2018 | Pouliot | B62D 15/0265 |
| 2018/0173237 A1* | 6/2018 | Reiley | G05D 1/0061 |
| 2018/0286269 A1* | 10/2018 | Lechner | G09B 9/085 |
| 2019/0213429 A1* | 7/2019 | Sicconi | G06F 3/016 |

* cited by examiner

FIG.5
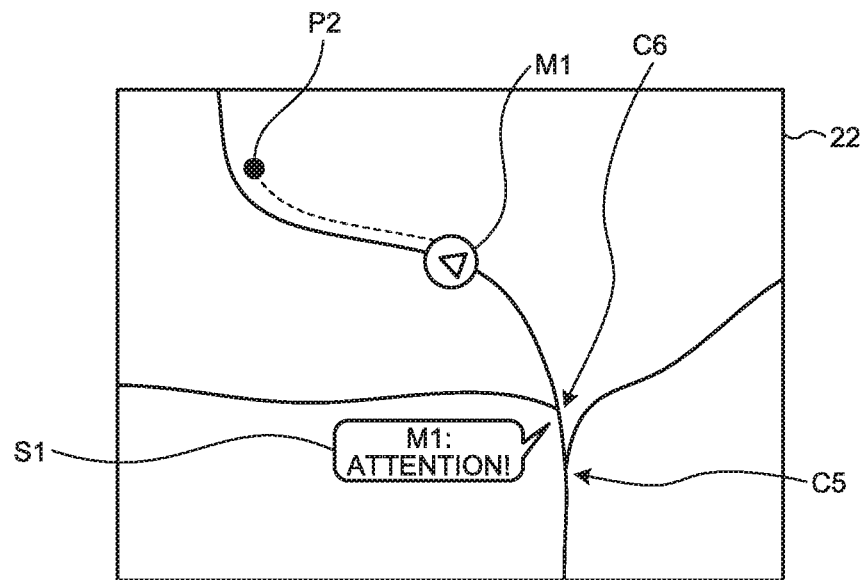
FIG.6
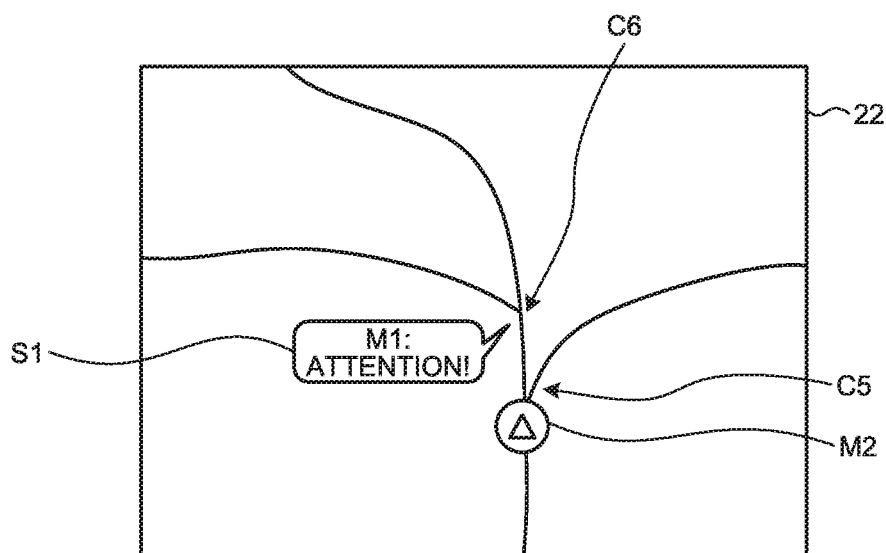

TERMINAL DEVICE, GROUP COMMUNICATION SYSTEM, AND GROUP COMMUNICATION METHOD

CROSS-REFERENCE TO RELATED APPLICATION

This application claims priority from Japanese Application No. 2018-056221, filed on Mar. 23, 2018, the contents of which are incorporated by reference herein in its entirety.

FIELD

The present application relates to a terminal device, a group communication system, and a group communication method.

BACKGROUND

Group communication systems for chats, and the like, are used, among members who belong to the same team or persons concerned with a sport competition such as a baseball game, to share information, such as a schedule of a game, a location of a venue of the game, or a route to the venue of the game. Sometimes, members who belong to the same team and persons concerned gather at a predetermined location on a day of a game and then drive to a venue for the game through a route separately in multiple vehicles. In such a case, a driver in each vehicle drives to a destination by checking navigation information presented on a display screen of an on-vehicle navigation device disclosed in Japanese Laid-open Patent Publication No. 2009-270886, for example.

The on-vehicle navigation device according to Japanese Laid-open Patent Publication No. 2009-270886 is configured to extract and display attention spots on a guided route, such as spots for a left turn or a right turn at crossings. However, even driving by checking the navigation information sometimes results in missing a route guidance or missing a crossroad for a left turn or a right turn. When multiple vehicles go to the destination separately, there is a possibility that the same problem as described above which occurs in the leading vehicle may occur in the following vehicle. In such a case, as there is demand for a smooth move to the venue for the game, information on the attention spots on the route obtained by the leading vehicle is shared by members in the following vehicle.

SUMMARY

A terminal device, a group communication system, and a group communication method are disclosed.

According to one aspect, there is provided a terminal device comprising: a communication unit configured to transmit and receive information; an input unit configured to receive input of state information indicating a state of a movable object; and a controller configured to determine whether a predetermined state change has occurred in the movable object based on the input state information, acquire, as attention information, state-changed position information indicating a state-changed position that is a position of the movable object when the predetermined state change has occurred and attention voice information including an attention content for the state-changed position as voice when it is determined that the predetermined state change has occurred, and cause the communication unit to transmit the acquired attention information.

According to one aspect, there is provided a group communication system comprising: a plurality of terminal devices installed in movable objects that are different from each other, each including: a communication unit configured to transmit and receive information; an output unit configured to output information; an input unit configured to receive input of state information indicating a state of a movable object; and a controller configured to determine whether a predetermined state change has occurred in the movable object based on the input state information, acquire, as attention information, state-changed position information indicating a state-changed position that is a position of the movable object when the predetermined state change has occurred and attention voice information including an attention content for the state-changed position as voice when it is determined that the predetermined state change has occurred, cause the communication unit to transmit the acquired attention information, and cause the output unit to output the attention information that is transmitted from a server and received by the communication unit; and the server configured to, when the attention information is received from one terminal device installed in one movable object among the movable objects, identify the one terminal device that is a transmission source of the attention information, adds identification information of the identified transmission source to the attention information, and transmits the attention information to the plurality of the terminal devices.

According to one aspect, there is provided a group communication method comprising: in one terminal device installed in one movable object among terminal devices installed in movable objects that are different from each other, determining, when state information indicating a state of the one movable object is input, whether a predetermined state change has occurred in the one movable object based on the input state information; acquiring, as attention information, state-changed position information indicating a state-changed position that is a position of the one movable object when the predetermined state change has occurred and attention voice information including an attention content for the state-changes position as voice when it is determined that the predetermined state change has occurred; transmitting the acquired attention information; outputting the attention information that is received from a server; and in the server, identifying, when the attention information is received from the one terminal device installed in the one movable object, the one terminal device that is a transmission source of the attention information; and adding identification information of the identified transmission source to the attention information and transmitting the attention information to the terminal devices.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 5 is a diagram that illustrates an example of the display contents on the display;

FIG. 6 is a diagram that schematically illustrates the state inside the vehicle;

DETAILED DESCRIPTION OF THE PREFERRED EMBODIMENTS

With reference to the drawings, an explanation is given below of embodiments of a group communication system according to the present application. Furthermore, the present application is not limited to the embodiments. Moreover, components in the embodiments described below include the ones that are replaceable and easy for a person skilled in the art or substantially the same ones.

Figure 1:
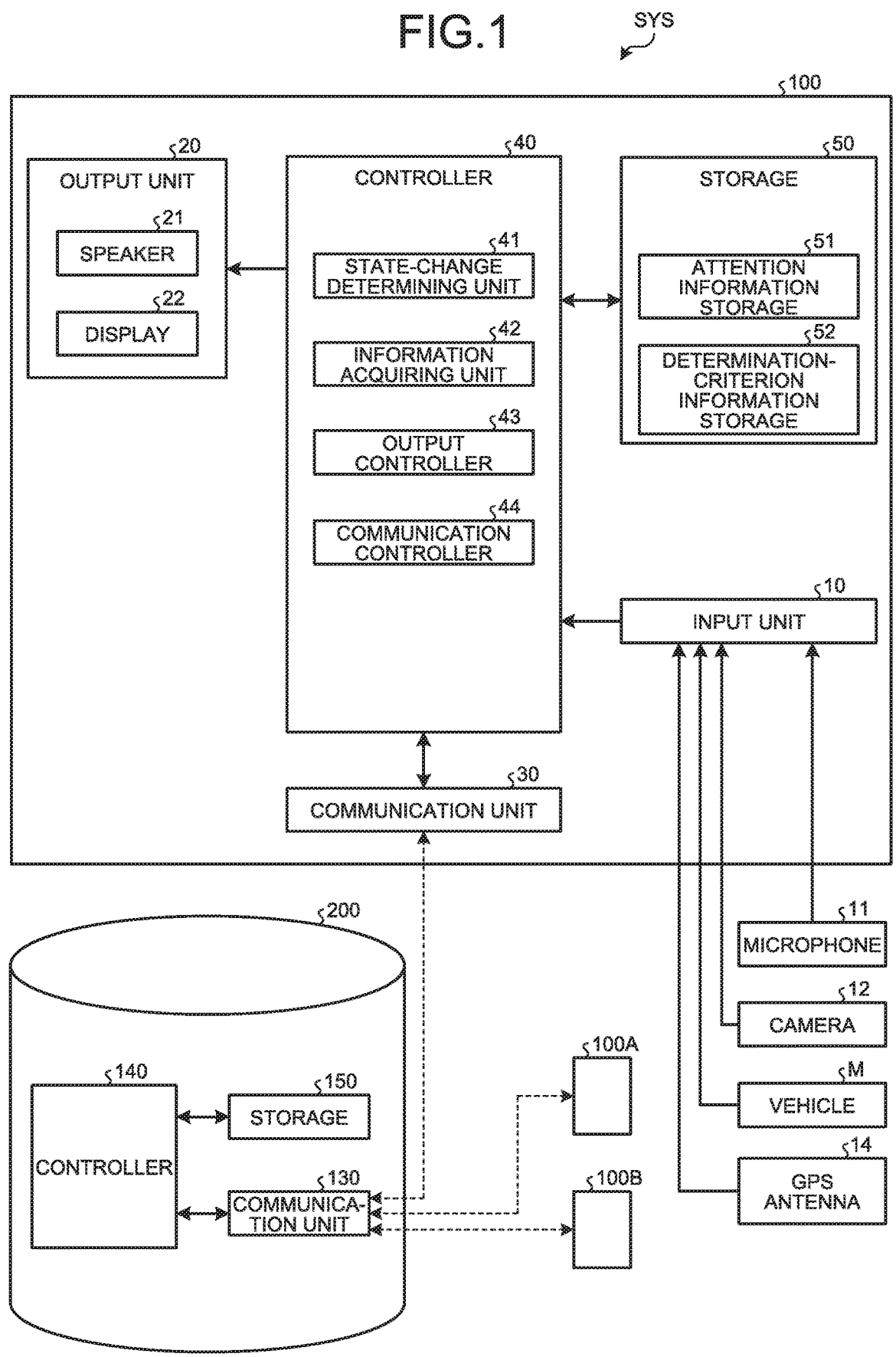
FIG. 1 is a block diagram that illustrates an example of a group communication system.

FIG. 1 is a block diagram that illustrates an example of a group communication system SYS. The group communication system SYS illustrated in FIG. 1 is used to perform communications among members who belong to the same team, persons involved, or the like, for a sport competition such as baseball. By using the group communication system SYS, it is possible to share information about a schedule of a game, a location of a venue for the game, a route to the venue for the game, or the like. In the following explanations, baseball is used as an example of the sport competition. However, this is not a limitation, and the same explanation may be applied to other sport competitions such as soccer, volleyball, tennis, or badminton. Furthermore, the group communication system SYS may be applied to competitions other than sports, such as dance tournament (dance competition), piano competition (musical competition), karuta competition (card competition or table game competition), or karaoke competition (singing competition).

As illustrated in FIG. 1, the group communication system SYS according to the present embodiment includes a plurality of terminal devices 100, 100A, and 100B and a server 200. Each of the terminal devices 100, 100A, and 100B may be a portable-type information terminal such as a mobile phones, a smartphones or a tablet-type computer or may be an on-vehicle type information terminal such as a car navigation terminal. The terminal devices 100, 100A, and 100B are installed in different movable objects. In the following explanation, for example, the movable object is a vehicle such as a car and occupants in the vehicle, and each of the terminal devices 100, 100A, and 100B is an on-vehicle type navigation terminal. However, this is not a limitation. Each of the terminal devices 100, 100A, and 100B has the same configuration. Furthermore, the number of the terminal devices 100, 100A, and 100B is not limited to 3, and it may be 2 or 4 or more. In the following explanation, the terminal device 100 is explained as an example for explaining a detailed configuration thereof. However, the same explanation is applicable to the terminal devices 100A, 100B.

Figure 2:
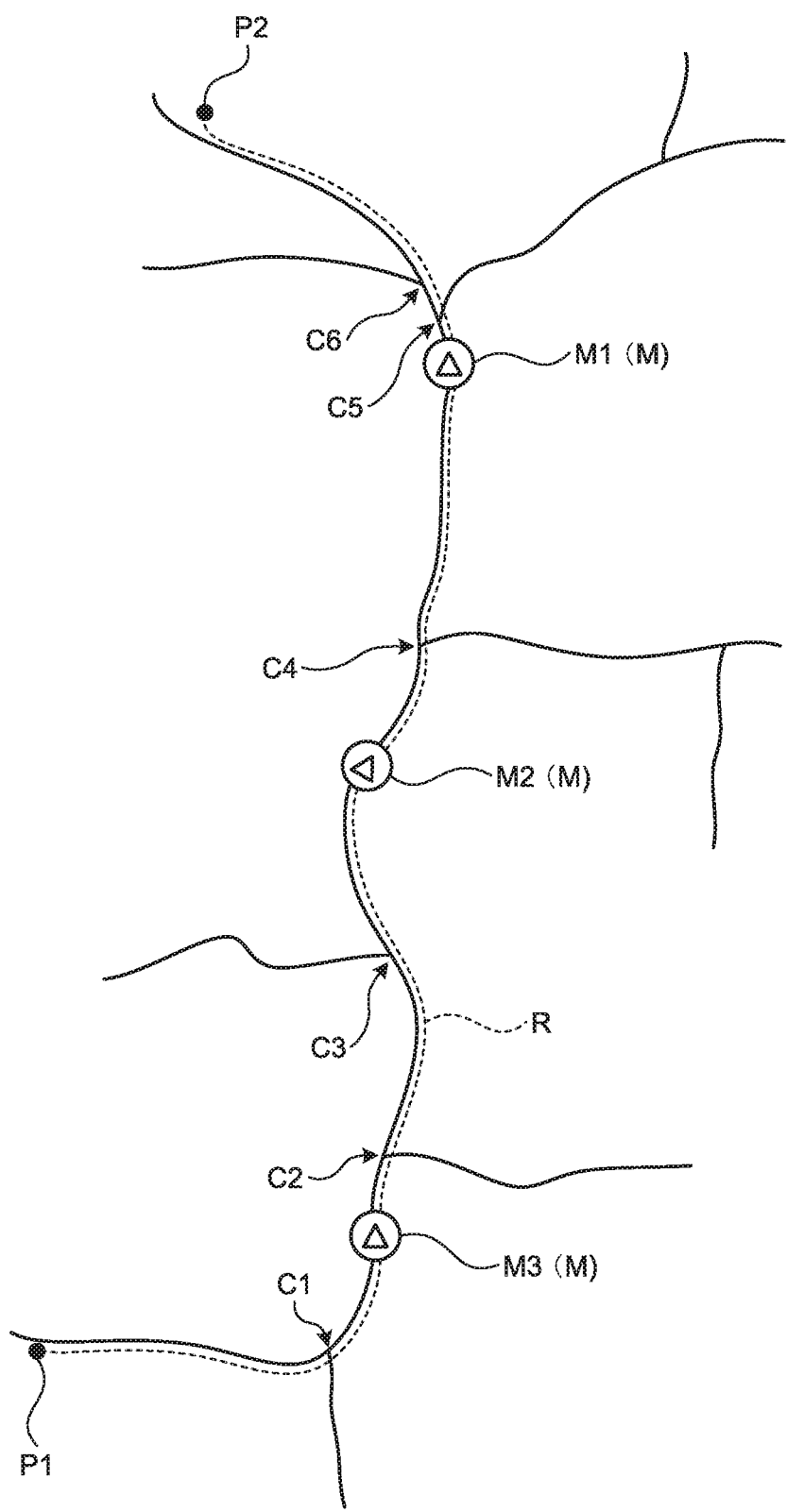
FIG. 2 is a diagram that illustrates a route through which vehicles are traveling according to the present embodiments.

FIG. 2 is a diagram that illustrates a route through which vehicles M are traveling according to the present embodiment. In the case explained according to the present embodiment, for example, the three vehicles M, i.e., vehicles M1, M2, and M3, travel separately through a route R from a start point P1 to a destination point P2. For example, six crossings C1 to C6 are present on the route R. However, this is not a limitation. Furthermore, for example, the terminal device 100 is installed in the vehicle M1. For example, the terminal device 100A is installed in the vehicle M2. For example, the terminal device 100B is installed in the vehicle M3. Thus, in the case explained according to the present embodiment, the terminal devices 100, 100A, and 100B are installed in the different vehicles M.

The terminal device 100 includes an input unit 10, an output unit 20, a communication unit 30, a controller 40, and a storage 50. The input unit 10 is connected to for example a microphone 11, a camera 12, or the like. The input unit 10 receives input of voice information from the microphone 11 and image information from the camera 12. The microphone 11 acquires voice in the vehicle, such as talking voice of occupants in the vehicle M, as voice information. The camera 12 acquires facial expression of the occupant in the vehicle M, or the like, as image information. Furthermore, the input unit 10 may be connected to a body-information acquiring unit not illustrated that acquires body information, such as heart rate or blood pressure of the occupant in the vehicle M.

Furthermore, the input unit 10 is connected to an output terminal, or the like, of the vehicle M. The input unit 10 receives information indicating a state of the vehicle M, such as a driving speed, a direction of a steering wheel, or a level of braking, as vehicle information. Furthermore, the input unit 10 is connected to a GPS antenna 14. The GPS antenna 14 acquires the position of the GPS antenna 14 from for example GPS satellites per unit time and inputs an acquired result as positional information to the input unit 10. Here, changes in the driving speed and the driving direction of the vehicle may be calculated in accordance with changes in the position of the vehicle per unit time acquired by the GPS antenna 14 to obtain the vehicle information.

The voice information and the image information input to the input unit 10 as described above are state information indicating a state of the occupant in the vehicle M. Furthermore, the vehicle information input to the input unit 10 is the state information indicating the state of the vehicle M. In this way, according to the present embodiment, at least one piece of the state information among the voice information, the image information, and the vehicle information is input to the input unit 10.

Furthermore, the input unit 10 is connected to an input device that allows predetermined input operations to input information. Examples of this type of input device include a touch panel. The input device outputs command signals to the controller 40 in accordance with the input operations. As the input device, other input devices such as a button, a lever, a dial, or a switch may be provided in addition to the touch panel or instead of the touch panel.

The output unit 20 includes a speaker 21 and a display 22. The speaker 21 outputs voice information. The display 22 presents various types of information including texts and images. The display 22 includes a display panel such as a liquid crystal panel.

The communication unit 30 communicates information with external devices through a wired line or wirelessly. The communication unit 30 transmits and receives information to and from for example the server 200. Furthermore, the communication unit 30 is capable of receiving navigation information from an external navigation server, or the like, for example.

The controller 40 controls each unit, i.e., the input unit 10, the output unit 20, and the communication unit 30 described above. Furthermore, the controller 40 performs calculation, processing, and the like, in accordance with the information input from the input unit 10. The controller 40 includes a processing device such as a CPU (central processing unit) and a storage device such as a RAM (random access memory) or a ROM (read only memory).

The controller 40 includes a state-change determining unit 41, an information acquiring unit 42, an output controller 43, and a communication controller 44.

The state-change determining unit 41 determines whether a predetermined state change occurred with regard to the state of the vehicle M or the occupant in the vehicle M based on the state information including at least one of the voice information, the image information, and the vehicle information input from the input unit 10.

For example, when driving the vehicle in accordance with the navigation information presented on the display of an on-vehicle navigation device, or the like, the driver or the passenger in the vehicle sometimes misses a route guidance while driving the vehicle M or misses a crossroad for a left turn or a right turn. Furthermore, it is sometimes difficult to follow a guided route due to an unexpected occurrence of traffic regulation, or the like, on the route guided in accordance with the navigation information. In such a case, the driver or the passenger sometimes have behaviors of, for example, saying "uh-oh" or "oh, no", or moving his/her face or eyes quickly, or his/her heart rate or the blood pressure may change. Furthermore, for some drivers, operations on a accelerator pedal, a brake pedal, a steering wheel, or the like, for example, are sometimes affected. At the location where the states of the vehicle M and the occupant in the vehicle M change as described above, there may be an attention spot on the route that is not indicated in navigation information, such as a direction indicated by a route guidance is hard to recognize, or a corner for a left turn or a right turn is hard to recognize.

Therefore, according to the present embodiment, it is determined that a predetermined state change has occurred when the state of the vehicle M and the occupant in the vehicle M have changed after passing through the attention spots not indicated in the navigation information. Specifically, the state-change determining unit 41 determines whether a predetermined state change has occurred based on the state information input from the input unit 10. With regard to forms of the predetermined state change, for example, information about movements of the occupant's eyes and face, type of speaking voice, changes in the heart rate or the blood pressure, or the like, is acquired as determination criterion information through experiments or measurements during the actual driving, and stored in a determination-criterion information storage 52 of the storage 50 described later. The state-change determining unit 41 compares the state information input to the input unit 10 with determination criterion information and, based a comparison result, determines whether the predetermined state change has occurred. The state-change determining unit 41 may make a determination based on a comparison result with regard to one type of the state information among the voice information, the image information, the body information, and the vehicle information or may make a determination by combining comparison results of multiple types of the state information.

When the state-change determining unit 41 determines that the state change has occurred, the information acquiring unit 42 acquires state-changed position information and attention voice information. The state-changed position information is information that indicates a position of the vehicle M where the state change has occurred. For example, by storing positional information input from the GPS antenna 14 with being related to a time in the storage 50, the information acquiring unit 42 may acquire the positional information on the time when the state change has occurred as the state-changed position information.

Furthermore, the attention voice information is voice information that includes attention content for the state-changed position as voices. The attention voice information may be provided by recording the attention content by the driver or the passenger. In this case, when the driver or the passenger speaks the attention content toward the microphone 11, the microphone 11 inputs voice information to the input unit 10. The information acquiring unit 42 acquires the voice information as attention voice information.

The communication controller 44 controls communication operations of the communication unit 30. The communication controller 44 causes the communication unit 30 to transmit attention information including at least one of the state-changed position information and the attention voice information acquired by the information acquiring unit 42. In this case, the communication controller 44 is capable of causing the communication unit 30 to simultaneously transmit the state-changed position information and the attention voice information in a related manner. According to the present embodiment, a transmission destination of the attention information is the server 200. The attention information transmitted to the server 200 is attached with identification information of the terminal device 100, which is a transmission source, and is then transmitted to the terminal devices 100, 100A, and 100B as described later. In this case, the communication controller 44 determines whether the attention information transmitted from the server 200 has been received.

The output controller 43 controls operations of the output unit 20. For example, the output controller 43 causes the speaker 21 to output the voice information. Furthermore, for example, the output controller 43 causes the display 22 to present images. The output controller 43 causes the display 22 to present navigation information that is received by the communication unit 30. In this case, for example, the display 22 presents the positions of the vehicles M, in which the terminal devices 100, 100A, and 100B are installed, with an icon S1, or the like, by being related to map information. Here, the route to the destination point P2 may be presented on the map. Furthermore, when the state-changed position information is acquired after the state-change determining unit 41 determines that the state change has occurred, the output controller 43 may cause the display 22 to present the acquired state-changed position information. Furthermore, the output controller 43 may cause the display 22 to present a message, or the like, prompting the driver or the passenger to record the attention voice information with regard to the attention content at the state-changed position as an image, cause the speaker 21 to output it as a voice, or output it as both the image and the voice.

Furthermore, when receiving the state-changed position information transmitted from the server 200, the output controller 43 causes the display 22 to present the state-changed position based on the received state-changed position information. Furthermore, when receiving the attention voice information transmitted from the server 200, the output controller 43 causes the speaker 21 to output the received attention voice information. The output controller 43 may cause the identification information of the terminal device 100 by which the attention information has been generated to be displayed.

Here, the output controller 43 causes the attention voice information to be output in a case of driving under a predetermined condition with regard to the state-changed position. That is, the output controller 43 does not cause the attention voice information to be output in a case of driving while a predetermined condition is not satisfied with regard to the state-changed position. Here, the predetermined condition may include, for example, a condition within a predetermined time period after the state change has occurred as a condition 1, a condition of passing through an identical route for the terminal device of the transmission source as a condition 2, or a condition of reaching a position at a predetermined distance from the state-changed position (condition 3).

As for the condition 1, when a long time has elapsed after the state change has occurred, there is a possibility that the environment around the state-changed position has changed and the attention spot has disappeared or changed. For example, although there is an unexpected occurrence of traffic regulation on the route that is guided by the navigation information when the state change has occurred, there is a possibility that the traffic regulation is canceled due to an elapsed time. In such a case, when the occupant in the following vehicle hears the attention voice information from the speaker 21 after the traffic regulation has been cancelled, he/she is likely to be confused. Therefore, the output controller 43 refrains from outputting the attention voice information when a predetermined time period has passed after the state change has occurred.

With regard to the condition 2, there is a possibility that passing through a route different from that of the terminal device of the transmission source does not reach the state-changed position. Furthermore, there is a possibility that it is not appropriate to apply the same attention content to a case of reaching through a different route even though the state-changed position is reached. For example, reaching to a crossing at which the state change has occurred through different routes includes difference in directions such as right, left, and straightforward with respect to the traveling direction of each vehicle between the routes. Therefore, when hearing the attention content such as "please turn right" or "please bypass traffic jams ahead in a straight direction" as the attention voice information, the driver drives the vehicle in a direction different from that of the attention content intended by the occupant who recorded the attention voice information. Therefore, the output controller 43 refrains from outputting the attention voice information in the case of passing through a route different from that of the terminal device of the transmission source.

With regard to the condition 3, there is a possibility that the driver forgets the attention content when he/she reaches the actual state-changed position after he/she has heard the attention content of the state-changed position at a position far away from the state-changed position. Therefore, the output controller 43 refrains from outputting the attention voice information in the case of a position far from the state-changed position by more than a predetermined distance.

The condition 1 and the condition 3 described above may be set in accordance with a type of usage and an intended use of the group communication system SYS according to the present embodiment. For example, for travelling to a venue for a game on the day of the game according to the present embodiment, the predetermined time period in the condition 1 may be set to, for example, about several minutes to several hours. However, this is not a limitation. Furthermore, the predetermined distance in the condition 3 may be set to a distance such that, after the driver in the following vehicle hears the attention voice information, he/she can ensure a preparation time before reaching the state-changed position and also set to a distance that is not too far from the state-changed position. This predetermined distance may be set to, for example, about several dozens of meters to several hundreds of meters. However, this is not a limitation. Here, when at least one of the condition 1 to the condition 3 is not satisfied, the output controller 43 may refrain from outputting the attention voice information and also refrain from presenting the state-changed position information on the display 22.

The storage 50 includes storage such as a hard disk drive or a solid state drive. Furthermore, as the storage 50, an external storage medium such as a removable disk may be used. The storage 50 stores an operating system of the terminal device 100, various programs for controlling operations of the input unit 10, the output unit 20, and the communication unit 30, navigation applications for conducting navigation, various programs, data, and the like.

Furthermore, the storage 50 includes an attention information storage 51 and the determination-criterion information storage 52. The attention information storage 51 stores the attention information acquired by the information acquiring unit 42 in the controller 40. The determination-criterion information storage 52 stores information that is used as a criterion when the state-change determining unit 41 determines whether a predetermined state change has occurred.

The server 200 manages the terminal devices 100, 100A, and 100B as terminal devices that belong to the same group. Here, the server 200 may also serve as a navigation server that provides the navigation information. The server 200 includes a communication unit 130, a controller 140, and a storage 150. The communication unit 130 is capable of transmitting/receiving information to/from the multiple terminal devices (the terminal devices 100, 100A, and 100B). The communication unit 130 receives the attention information transmitted from the terminal device 100.

The controller 140 performs predetermined calculations, processing, and the like. The controller 140 includes a processing device such as a CPU and a storage device such as a RAM or a ROM. The controller 140 determines whether the attention information has been received from the terminal device 100. When the attention information has been received, the controller 140 identifies the terminal device (the terminal device 100 according to the present embodiment) that is the transmission source and adds the identification information on the terminal device (100), which is the transmission source, to the attention information. The controller 140 transmits the attention information with the identification information added thereto to each of the terminal devices 100, 100A, and 100B.

Figure 3:
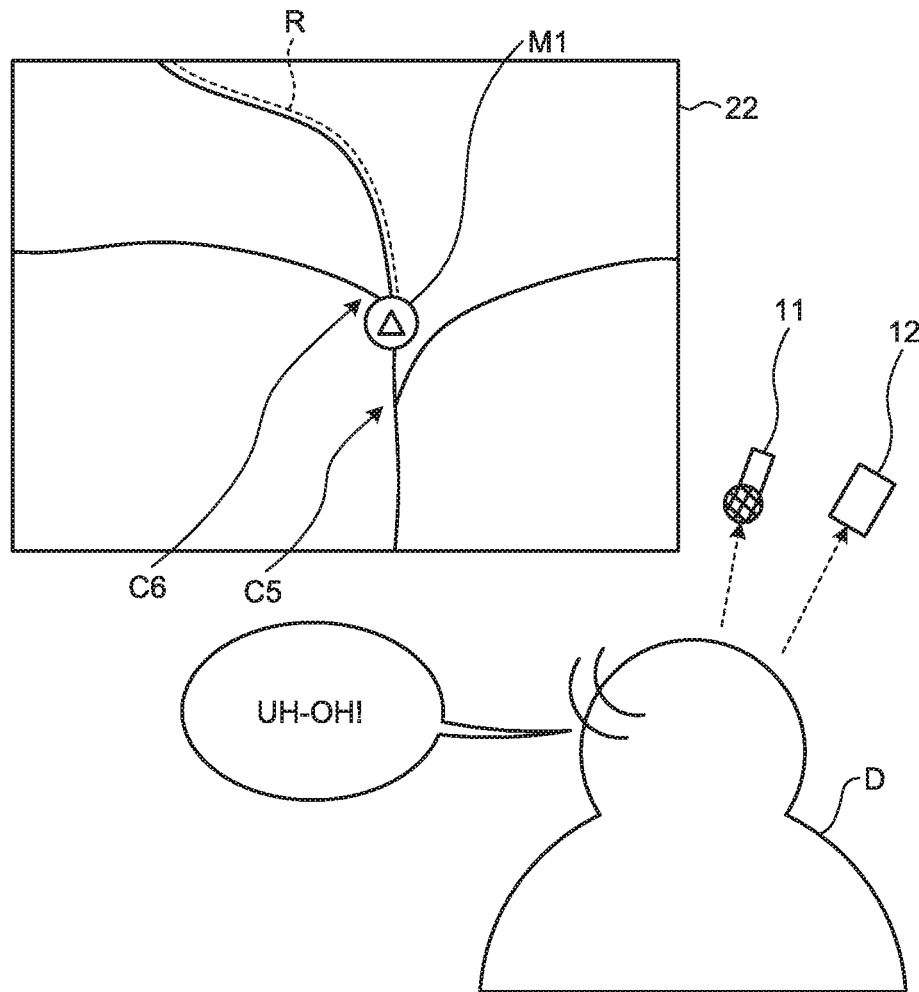
FIG. 3 is a diagram that schematically illustrates a state inside the vehicle.

Next, operation of the group communication system SYS is explained. FIG. 3 is a diagram that schematically illustrates a state inside the vehicle M1 in which the terminal device 100 is installed. FIG. 3 illustrates a situation where, when the vehicle M1 reaches a crossing C6 after passing through a crossing C5, a driver D says "uh-oh" and suddenly moves his head. In this case, the driver D's voice "uh-oh" is input to the microphone 11 to be input as voice information to the input unit 10. Furthermore, the same applies to a case where a passenger says the word. Furthermore, a behavior of the driver D of suddenly moving his head is captured by the camera 12 to be acquired as image information by the input unit 10. By setting an imaging range of the camera 12 appropriately, a behavior of the passenger of suddenly moving his face or eyes are input in the same manner. Furthermore, the heart rate or the blood pressure of the driver or the passenger may be measured by a measurement device not illustrated, or the like to be input as body information to the input unit 10. Moreover, the driver D's rapid operation of the accelerator pedal, the brake pedal, or the steering wheel is input as vehicle information to the input unit 10.

The state-change determining unit 41 determines whether a predetermined state change has occurred based on the state information input to the input unit 10 and the determination criterion information stored in the determination-criterion information storage 52 of the storage 50. In a case explained below, the state-change determining unit 41 determines that a predetermined state change has occurred based on the voice information (speaking voice) of the driver D and the image information (sudden movement of the head).

Figure 4:
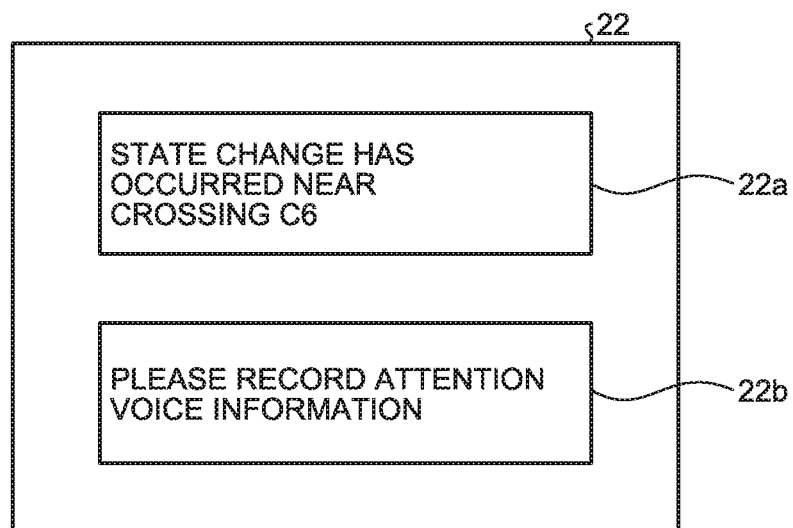
FIG. 4 is a diagram that illustrates an example of display contents of a display.

When the state-change determining unit 41 determines that a predetermined state change has occurred, the information acquiring unit 42 acquires the state-changed position information and the attention voice information as the attention information. The information acquiring unit 42 acquires, as the state-changed position information, information that the state-changed position is near the crossing C6 based on the input from the GPS antenna 14. FIG. 4 is a diagram that illustrates an example of display contents of the display 22. When the state-change determining unit 41 determines that a predetermined state change has occurred and the information acquiring unit 42 acquires the state-changed position information, the output controller 43 causes the display 22 to present a message 22a for showing that a state change has occurred at the crossing C6 and a message 22b for prompting the driver or passenger to record attention voice information, as illustrated in FIG. 4.

In the case explained in FIG. 4, the display 22 presents a name of a place (the crossing C6) on the route as character information. However, this is not a limitation. For example, the position of the vehicle M1 may be indicated together with a map, or the position of the vehicle M1 may be indicated by coordinates of latitude and longitude. Furthermore, in the case explained, the display 22 presents the message for prompting to record the attention content as the character information. However, this is not a limitation. For example, an image, or the like, representing a behavior of speaking to a microphone may be displayed.

When the message 22b is displayed, the occupant in the vehicle M1 speaks the attention content to the microphone 11, and the spoken attention content are input as the voice information to the input unit 10. The information acquiring unit 42 acquires the voice information input to the input unit 10 as the attention voice information and stores it in the attention information storage 51 of the storage 50. The attention information storage 51 stores, for example, the state-changed position information indicating the state-changed position of the vehicle M and the attention voice information including the attention content of the state-changed position in a related manner.

After the information acquiring unit 42 acquires the state-changed position information and the attention voice information as the attention information, the communication controller 44 transmits the acquired attention information to the server 200. The transmitted attention information is received by the communication unit 130 of the server 200. When the attention information is received, the controller 140 identifies the terminal device 100 that is the transmission source and adds the identification information of the terminal device 100 to the attention information. In the case explained according to the present embodiment, for example, the controller 140 adds information of the vehicle M1, in which the terminal device 100 is installed, as the identification information. However, this is not a limitation, and the identification information, or the like, of an owner of the terminal device 100 may be added. The controller 140 transmits the attention information with the identification information added thereto to each of the terminal devices 100, 100A, and 100B.

In the terminal devices 100, 100A, and 100B, the communication controller 44 determines whether the attention information transmitted from the server 200 has been received. When the state-changed position information transmitted from the server 200 has been received, the output controller 43 causes the display 22 to present the state-changed position indicated by the received state-changed position information.

FIG. 5 is a diagram that illustrates an example of display contents on the display 22. As illustrated in FIG. 5, the output controller 43 causes the display 22 to present the state-changed position with, for example, the icon S1 that is a word balloon. Icons are not limited to word balloons, but they may be other types of icons. Furthermore, it is also possible that, for example, a predetermined phrase and an icon are related in a setting and, when a predetermined phrase is included in the attention voice information, the icon corresponding to the predetermined phrase is displayed. When the display 22 presents the navigation information such as a map or a position of the vehicle M1 according to the present embodiment, the output controller 43 may present the word balloon at a position corresponding to the navigation information, that is, may present the word balloon at a position in the map corresponding to the state-changed position to be displayed in a superimposed manner. Furthermore, the output controller 43 may present the identification information of the terminal device 100 in which the attention information has been generated. In FIG. 5, for example, the identification information of the vehicle M1 with the terminal device 100 is indicated inside the word balloon. This allows the occupant seeing the display 22 to known that it is the attention information by the vehicle M1.

FIG. 6 is a diagram that schematically illustrates a state inside the vehicle M2. In the case illustrated in FIG. 6, the vehicle M2 follows the vehicle M1 and, within a predetermined time period after the state change has occurred, the vehicle M2 comes close to the state-changed position by a predetermined distance through the identical route for the vehicle M1. In this case, the output controller 43 causes the speaker 21 to output the attention voice information "please follow the road on the right side". As illustrated in FIG. 6, with regard to the crossing C6 that is the state-changed position, the display 22 presents the crossing C6 in a straight direction. However, the driver in the vehicle M2, who hears this attention voice information, can drive to the crossing C6 with being aware of the attention content that he has to follow the road that is actually recognized on the right side.

Figure 7:
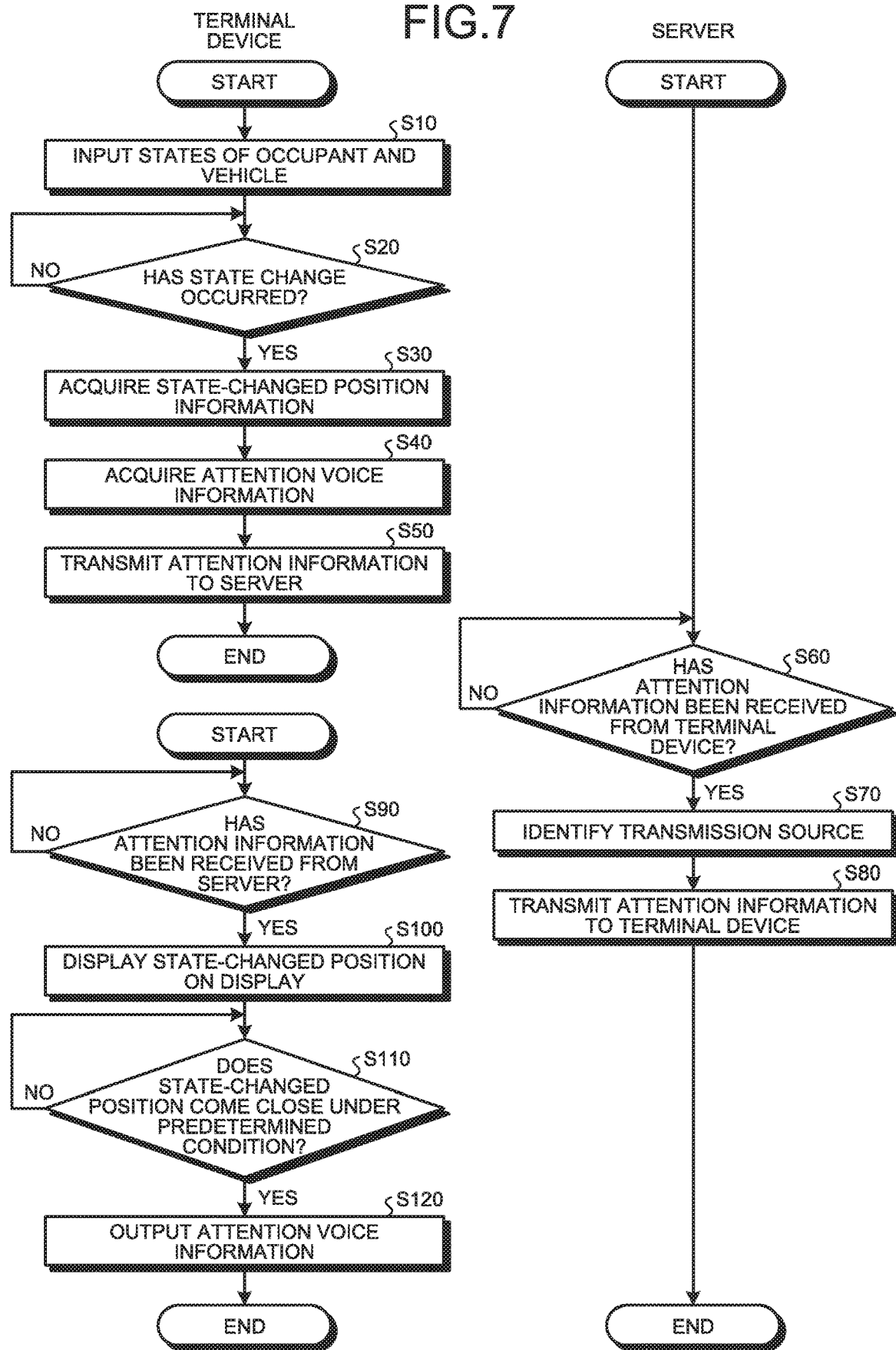
FIG. 7 is a flowchart that illustrates an example of operations of terminal devices and a server in the group communication system.

FIG. 7 is a flowchart that illustrates an example of operations of the terminal devices 100, 100A, 100B, and the server 200 in the group communication system SYS. In illustration of FIG. 7, the operations of the terminal devices 100, 100A, and 100B are arranged alongside the operation of the server 200. As illustrated in FIG. 7, the terminal devices 100, 100A, and 100B receive input of the state information, such as the voice information, the image information, the body information, or the vehicle information, which are input from the input unit 10 (Step S10). The state-change determining unit 41 determines whether a state change has occurred based on the input state information (Step S20). When it is determined that a state change has occurred (Yes at Step S20), the state-change determining unit 41 acquires, as the attention information, the state-changed position information indicating the position of the vehicle M when the state change has occurred (Step S30). Furthermore, the state-change determining unit 41 acquires the attention voice information including the attention content as the attention information (Step S40). The communication controller 44 transmits the acquired attention information to the server 200 (Step S50).

Meanwhile, the server 200 determines whether the attention information has been received from the terminal device 100 (Step S60). When no attention information has been received (No at Step S60), the server 200 repeatedly performs the process at Step S60 until the attention information is received. Furthermore, when the attention information has been received (Yes at Step S60), the server 200 identifies the terminal device that is the transmission source of the attention information (Step S70). The server 200 adds the identification information of the terminal device, which is the transmission source, to the attention information and transmits the attention information to the terminal devices 100, 100A, and 100B (Step S80).

In the terminal devices 100, 100A, and 100B, the communication controller 44 determines whether the attention information has been received from the server 200 (Step S90). When no attention information has been received (No at Step S90), the communication controller 44 repeatedly performs the process at Step S90 until the attention information has been received. When the attention information has been received (Yes at Step S90), the output controller 43 causes the display 22 to display the state-changed position indicated by the state-changed position information, included in the received attention information (Step S100). Then, the output controller 43 determines whether the state-changed position comes close while the predetermined conditions (the condition 1 to the condition 3) are satisfied (Step S110). When it is determined that the predetermined conditions are not satisfied (No at step S110), the output controller 43 repeatedly makes a determination at Step S110. When it is determined that the predetermined conditions are satisfied (Yes at Step S110), the output controller 43 causes the speaker 21 to output the attention voice information (Step S120).

As described above, each of the terminal devices 100, 100A, and 100B according to the present embodiment includes the communication unit 30 that is capable of transmitting/receiving information, the input unit 10 that receives input of the state information indicating at least one of the states of the vehicle M and the occupant in the vehicle M, and the controller 40 that determines whether a predetermined state change has occurred in at least one of the vehicle M and the occupant in the vehicle M based on the input state information, acquires, as the attention information, the state-changed position information indicating the state-changed position that is the position of the vehicle M when the state change has occurred and the attention voice information including the attention content for the state-changed position as voice, and causes the communication unit 30 to transmit the acquired attention information.

Furthermore, the group communication system SYS according to the present embodiment includes the terminal devices 100, 100A, and 100B installed in the different vehicles M, each including the communication unit 30 that is capable of transmitting/receiving information, the output unit 20 that outputs information, the input unit 10 that receives the input of the state information indicating at least one of the state of the vehicle M and the state of the occupant in the vehicle M, and the controller 40 that determines whether a predetermined state change has occurred in at least one of the vehicle M and the occupant in the vehicle M based on the input state information, acquires, as the attention information, the state-changed position information indicating the state-changed position that is the position of the vehicle M when the state change has occurred and the attention voice information including the attention content for the state-changed position as voice when it is determined that the state change has occurred, causes the communication unit 30 to transmit the acquired attention information, and causes the output unit 20 to output the attention information that is transmitted from the server 200 and is received by the communication unit 30, and the server 200 that, when the attention information is received from the terminal device 100 installed in the vehicle M1, identifies the terminal device 100 that is the transmission source of the attention information, adds the identification information of the identified transmission source to the attention information, and transmits the attention information to the terminal devices 100, 100A, and 100B.

Furthermore, the group communication method according to the present embodiment includes, in the terminal device 100 installed in the vehicle M1 among the terminal devices 100, 100A, and 100B installed in the different vehicles M, determining whether a predetermined state change has occurred in at least one of the vehicle M1 and the occupant in the vehicle M1 based on the input state information when the state information indicating at least one of the state of the vehicle M1 and the state of the occupant in the vehicle M1 is input, acquiring, as the attention information, the state-changed position information indicating the state-changed position that is the position of the vehicle M1 when the state change has occurred and the attention voice information including the attention content for the state-changed position as voice when it is determined that the state change has occurred, transmitting the acquired attention information, outputting the attention information received from the server 200, and in the server, identifying the terminal device 100 that is the transmission source of the attention information when the attention information is received from the terminal device 100 installed in the vehicle M1, adding the identification information of the identified transmission source to the attention information, and transmitting the attention information to the terminal devices 100, 100A, and 100B.

According to the present embodiment, when the state change has occurred in the leading vehicle M and the occupant, the attention content with regard to the state-changed position may be notified to the following vehicle M. In this way, when the vehicles M move separately from the start point P1 to the destination point P2, the attention spots on the route obtained by the leading vehicle M may be shared by the members in the following vehicle M, thus the vehicles M can travel to the destination point P2 smoothly.

Furthermore, the terminal devices 100, 100A, and 100B according to the present embodiment include the output unit 20 that outputs information, the communication unit 30 is capable of receiving the attention information transmitted from other terminal devices, and the controller 40 causes the output unit 20 to output the attention information received by the communication unit 30. Thus, the terminal devices 100, 100A, and 100B are capable of notifying the attention information to one another.

Furthermore, in the terminal devices 100, 100A, and 100B according to the present embodiment, the controller 40 causes the output unit 20 to output the attention voice information when the vehicle M comes close to the state-changed position indicated by the state-changed position information by a predetermined distance through the identical route for the vehicle M1 within a predetermined time period after the state change has occurred. Thus, the attention information may be used in an effective way by the vehicle M that follows the vehicle M in which the terminal device that is the transmission source of the attention information is installed.

Furthermore, in the terminal devices 100, 100A, and 100B according to the present embodiment, the communication unit 30 is capable of receiving the navigation information, the output unit 20 includes the display 22 that is capable of presenting information, and the controller 40 causes the display 22 to present the received navigation information and the state-changed position indicated by the received state-changed position information in a related manner. Thus, the state-changed position is easily recognizable.

The technical scope of the present application is not limited to the above-described embodiment, and modifications may be made as appropriate without departing from the scope of the present application. In the example of configuration explained according to the above-described embodiment, when the state-change determining unit 41 determines that a predetermined state change has occurred, the information acquiring unit 42 acquires the attention voice information. However, this is not a limitation. For example, the information acquiring unit 42 may refrain from acquiring the attention voice information when the state-change determining unit 41 determines that a predetermined state change has occurred.

Figure 8:
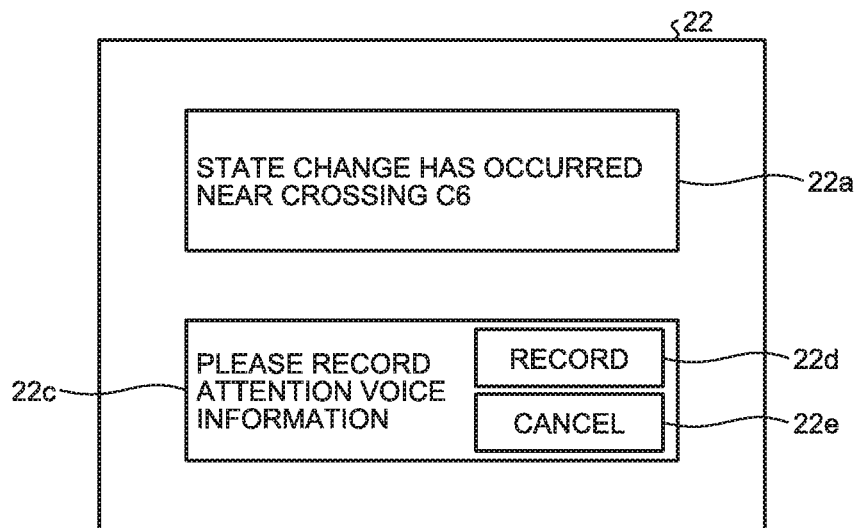
FIG. 8 is a diagram that illustrates another example of the display contents on the display.

FIG. 8 is a diagram that illustrates another example of display contents on the display 22. As illustrated in FIG. 8, the output controller 43 causes the display 22 to present the message 22a for showing a state change occurred at the crossing C6 and a message 22c for prompting the driver or the passenger to record the attention voice information. In this case, a record button 22d and a cancel button 22e are displayed together with the message 22c. In this case, the display 22 includes a touch panel, and when areas corresponding to the record button 22d and the cancel button 22e are touched, command signals corresponding thereto are transmitted to the controller 40.

According to the above-described embodiment, there is a possibility that the state-change determining unit 41 determines that a predetermined state change has occurred when, for example, the occupant in the vehicle M turns his/her head simply and suddenly or moves his/her eyes suddenly without any relation to the attention spots on the route. In such a case, the occupant in the vehicle M touches the cancel button 22e to cancel the recording. Thus, output of the attention information unrelated to the attention spots on the route may be prevented. Furthermore, when it is determined that the predetermined state change has occurred due to an action of the occupant in the vehicle M without any relation to the attention spots on the route, the attention voice information indicating no relation with the attention spots may be recorded by touching the record button 22d.

Figure 9:
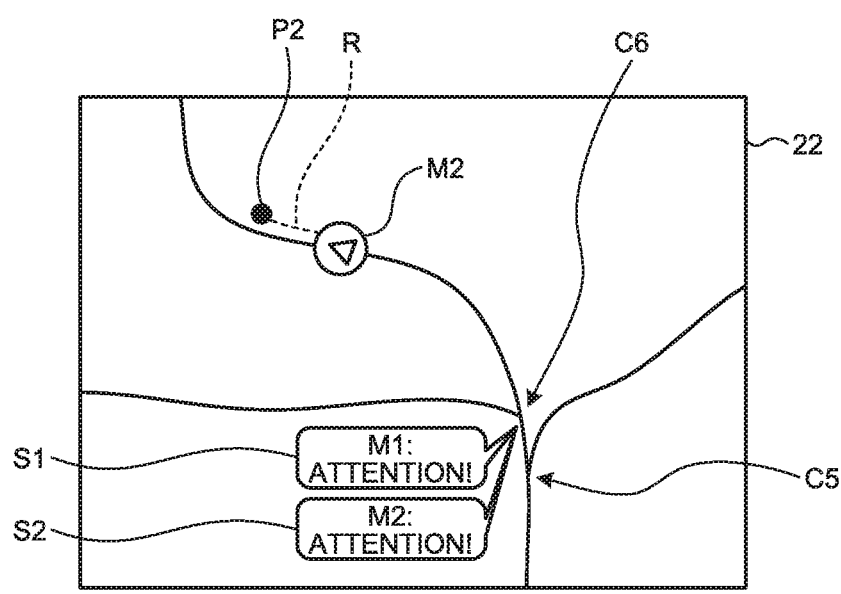
FIG. 9 is a diagram that illustrates another example of the display contents on the display.

FIG. 9 is a diagram that illustrates another example of the display contents on the display 22. According to the configuration of the embodiments described above, when the attention information is received from the server 200, the icon S1 is displayed at the state-changed position. However, as illustrated in FIG. 9, the attention information (presented as the icon S1) by the leading vehicle M1 may be corrected or additional attention information may be generated by the terminal device 100A installed in the following vehicle M2. In this case, the attention information generated by the terminal device 100A is transmitted to the server 200 and, after being attached with the identification information on the terminal device 100A (the vehicle M2) that is the transmission source, the attention information is transmitted to each of the terminal devices 100, 100A, and 100B. Thus, the corrected or added attention information is presented as an icon S2 while it is superimposed on the state-changed position indicated by the icon S1. The icon S2 indicates the identification information on the vehicle M2 that is the transmission source. Thus, for example, when the attention information by the leading vehicle M1 is not correct or additional information needs to be added, the attention information is corrected or added so that the following vehicle M (e.g., the vehicle M3) may be provided with more accurate information.

Furthermore, in the embodiments described above, the communication controller 44 causes the state-changed position information and the attention voice information to be simultaneously transmitted to the server 200. However, this is not a limitation. When the state-changed position information is acquired before acquiring the attention voice information, the communication controller 44 may cause the communication unit 30 to transmit the state-changed position information at a time when the state-changed position information is acquired. Thus, the following vehicle M may be instantaneously notified that the state change has occurred. Afterward, when the attention voice information is acquired, the communication controller 44 may cause the communication unit 30 to transmit the attention voice information alone or may cause the communication unit 30 to simultaneously transmit the state-changed position information and the attention voice information in a related manner again.

Furthermore, in the example of the case explained according to the above-described embodiment, the terminal devices 100, 100A, and 100B are on-vehicle type navigation terminals. However, this is not a limitation. For example, the terminal devices 100, 100A, and 100B may be portable information terminals that are capable of performing information communications such as chats in the same group. In this case, the navigation information is not transmitted or displayed in each of the terminal devices 100, 100A, and 100B, and only the attention information is transmitted to each of the terminal devices 100, 100A, and 100B to be displayed in each of the terminal devices 100, 100A, and 100B.

Furthermore, a configuration may be such that different terminal devices 100, 100A, and 100B are installed in vehicles, such as bicycles, other than cars. With this configuration, movable objects are bicycles and members riding on the bicycles. Due to the configuration, when the members in a group go cycling by bicycles in which the terminal devices 100, 100A, and 100B are installed, the attention spots on the route obtained by the leading bicycle is shared by the following member, thus the bicycles and members can travel to the destination point P2 smoothly.

Furthermore, a configuration may be such that, for example, members in a group carry different terminal devices 100, 100A, and 100B. In this configuration, movable objects are the members in the group. With this configuration, when the members who carry the terminal devices 100, 100A, and 100B go hiking, orienteering, or the like, the attention spots on the route obtained by the leading member is shared by the following member, thus the members can travel to the destination point P2 smoothly.

According to the present application, the attention spots on the route obtained by the leading movable object is shared by the following movable object, thus the movable objects can travel to the destination point smoothly.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal device included in a group communication system comprising multiple terminal devices installed in movable objects that are different from each other as one terminal device and a server which is provided independently of the multiple terminal devices and which receives and transmits information from and to the multiple terminal devices and installed in one movable object, comprising:
    a communication unit configured to transmit and receive information;
    an input unit configured to receive input of voice of occupants in a movable object as state information; and
    a controller configured to:
        determine whether a predetermined state change has occurred in the movable object based on the state information;
        acquire, as attention information, state-changed position information indicating a state-changed position that is a position of the movable object when the predetermined state change has occurred and attention voice information including an attention content for the state-changed position as voice of the occupants in association with each other when it is determined that the predetermined state change has occurred; and
        cause the communication unit to transmit the attention information to a server; and
    an output unit configured to output information, wherein the communication unit is further configured to receive, through the server, the attention information that is transmitted from other terminal devices installed in the movable objects other than the one movable object,
    the controller is further configured to cause the output unit to output the attention information received from the server, and
    the server is configured to, in response to receiving the attention information from the terminal device, identify the terminal device that is a transmission source of the attention information, add identification information of the terminal device that is the transmission source to the attention information, and transmit the attention information to the other terminal devices.

2. The terminal device according to claim 1, wherein the controller is further configured to cause the output unit to output the attention voice information in response to determining that a movable object in which a terminal device other than the terminal device that is the transmission source of the attention information is provided comes within a predetermined distance of the state-changed position indicated by the state-changed position information received from the server through an identical route for the movable object in which the terminal device that is the transmission source of the attention information is provided within a predetermined time period after the predetermined state change has occurred.

3. The terminal device according to claim 1, wherein
    the communication unit is further configured to receive navigation information,
    the output unit includes a display configured to display information, and
    the controller is further configured to cause the display to display the navigation information and the state-changed position indicated by the state-changed position information.

4. The terminal device according to claim 1, wherein the controller is further configured to, in response to acquiring the state-changed position information before acquiring the attention voice information, cause the communication unit to transmit the state-changed position information at a time when the state-changed position information is acquired.

5. A group communication system comprising multiple terminal devices installed in movable objects that are different from each other and a server which is provided independently of the multiple terminal devices and which receives and transmits information from and to the multiple terminal devices,
    wherein each of the multiple terminal devices comprises:
        a communication unit configured to transmit and receive information;
        an output unit configured to output information;
        an input unit configured to receive input of voice of occupants of a movable object as state information; and
        a controller configured to:
            determine whether a predetermined state change has occurred in the movable object based on the input state information;
            in response to determining that the predetermined state change has occurred, acquire, as attention information, state-changed position information indicating a state-changed position that is a position of the movable object when the predetermined state change has occurred and attention voice information including an attention content for the state-changed position as voice of occupants in association with each other;
            cause the communication unit to transmit the acquired attention information to a server; and
            cause the output unit to output the attention information from other terminal devices installed in other of the movable objects that is transmitted from the server and received by the communication unit; wherein
    the server is further configured to, in response to receipt of the attention information from one of the terminal devices installed in one movable object among the movable objects, identify the one of the terminal devices that is a transmission source of the attention information, add identification information of the one of the terminal devices that is the transmission source to the attention information, and transmit the attention information to the multiple terminal devices.

6. A group communication method in a group communication system comprising multiple terminal devices installed in movable objects that are different from each other and a server which is provided independently of the multiple terminal devices and which receives and transmits information from and to the multiple terminal devices, comprising:
    in one terminal device installed in one movable object among terminal devices installed in movable objects that are different from each other, determining, when voice of occupants in one movable object is input as state information, whether a predetermined state change has occurred in the one movable object based on the state information;

in response to determining that the predetermined state change has occurred, acquiring, as attention information, state-changed position information indicating a state-changed position that is a position of the one movable object when the predetermined state change has occurred and attention voice information including an attention content for the state-changes position as voice of the occupants in association with each other;

transmitting the attention information to a server; and outputting the attention information from other terminal devices installed in other of the moveable objects that is received from the server;

and in the server, identifying, in response to receipt of the attention information from the one terminal device installed in the one movable object, the one terminal device that is a transmission source of the attention information; and adding identification information of the one terminal device that is the transmission source to the attention information and transmitting the attention information to the terminal devices.

* * * * *